(12) United States Patent
Chao

(10) Patent No.: US 10,178,415 B2
(45) Date of Patent: Jan. 8, 2019

(54) CHAPTER DETECTION IN MULTIMEDIA STREAMS VIA ALIGNMENT OF MULTIPLE AIRINGS

(71) Applicant: PIKSEL, INC., Wilmington, DE (US)

(72) Inventor: Gerald C. Chao, Wilmington, DE (US)

(73) Assignee: PIKSEL, INC., Wilmington, DE (US)

( * ) Notice: Subject to any disclaimer, the term of this patent is extended or adjusted under 35 U.S.C. 154(b) by 0 days.

(21) Appl. No.: 15/266,860

(22) Filed: Sep. 15, 2016

(65) Prior Publication Data

US 2017/0078715 A1 Mar. 16, 2017

Related U.S. Application Data

(60) Provisional application No. 62/219,014, filed on Sep. 15, 2015.

(51) Int. Cl.
*H04N 7/173* (2011.01)
*H04N 21/234* (2011.01)
*H04N 21/2365* (2011.01)
*H04N 21/845* (2011.01)
*H04N 21/24* (2011.01)
*H04N 21/233* (2011.01)
*H04N 21/235* (2011.01)
*H04N 21/81* (2011.01)
*H04N 21/8549* (2011.01)

(52) U.S. Cl.
CPC ..... *H04N 21/23418* (2013.01); *H04N 21/233* (2013.01); *H04N 21/235* (2013.01); *H04N 21/2365* (2013.01); *H04N 21/2407* (2013.01); *H04N 21/812* (2013.01); *H04N 21/8455* (2013.01); *H04N 21/8456* (2013.01); *H04N 21/8549* (2013.01)

(58) Field of Classification Search
None
See application file for complete search history.

(56) References Cited

U.S. PATENT DOCUMENTS

| | | | | |
|---|---|---|---|---|
| 6,961,954 | B1* | 11/2005 | Maybury | G06F 17/30787 707/999.003 |
| 2006/0080356 | A1* | 4/2006 | Burges | G06F 17/30017 |
| 2008/0075303 | A1* | 3/2008 | Kim | G10H 1/125 381/103 |
| 2010/0306193 | A1* | 12/2010 | Pereira | G06F 17/30784 707/728 |
| 2016/0125889 | A1* | 5/2016 | Westerman | G10L 25/51 704/270 |

OTHER PUBLICATIONS

Jacobs et al., "Fast Multiresolution Image Querying", ACM, 1995.*

* cited by examiner

*Primary Examiner* — James R Marandi
(74) *Attorney, Agent, or Firm* — Holzer Patel Drennan

(57) ABSTRACT

There is described a multimedia processing method comprising: identifying a start and end time ranges in an input multimedia stream; comparing said ranges to an alternate multimedia stream of the same program for regions of similarity; and defining time ranges as representing chapter regions responsive to the content of both streams within the time ranges having high similarities.

19 Claims, 7 Drawing Sheets

CHAPTER DETECTION IN MULTIMEDIA STREAMS VIA ALIGNMENT OF MULTIPLE AIRINGS

CROSS REFERENCE TO RELATED APPLICATION

The present application claims benefit of priority to U.S. Provisional Patent Application No. 62/219,014, entitled "Chapter Detection in Multimedia Streams Via Alignment of Multiple Airings" and filed on Sep. 15, 2015, which is specifically incorporated by reference herein for all that it discloses or teaches.

FIELD OF THE DISCLOSURE

The present disclosure relates to the processing of multimedia streams, and more specifically, an efficient and robust method to detect chapters within.

BACKGROUND

Multimedia streams are linear by nature, but the content within is usually organized into chapters, when the content transitions from one subject to another. However, whereas the chapters in books are clearly specified, chapters in most video streams are not defined, especially for live programming. This is due to the fact that video streams have largely been consumed linearly, and therefore chapters are not essential to their consumption. However, with the advent of interactive modes of video consumption, starting with DVDs, personal video recorders, and IP-delivered videos, chapters are becoming an important part of navigating and discovery of video content.

There are multiple approaches to automatically finding chapter boundaries, including the use of video analysis for black frames, audio analysis for speakers and audio transition, textual analysis of the stream's transcripts, and combinations thereof. However, these methods are often specifically designed to analyze certain types of programming, such as newscasts or movies, but are ill-suited for analyzing the other myriads of programming in other genres. That is, while an existing prior art may be effective for detecting chapters for newscasts, its accuracy would degrade quickly for non-newscasts such as drama or reality shows. Due to this limitation, existing prior arts are unable to accurately detect chapters across all types of programming, and therefore can only be applied to provide interactive video consumption for a small subset of video streams and thus limiting their usefulness.

Therefore, a need exists for a method for automatically detecting chapter boundaries within multimedia streams that is robust across all types of programming, and is automated and efficient so it can perform this detection for live video streams as they are being broadcast.

Various prior art arrangements are discussed in the following U.S. prior art documents.

U.S. Pat. No. 6,961,954—uses multiple types of analysis to find potential chapter boundaries, and uses finite state automata (FSA) to determine actual chapters. The assumption is that each show follows a traversal through the states of the automata, which is manually constructed and therefore either brittle or has to be continuously updated manually to account for changes in chapter structures. Additionally, the prior art does not address how to expand beyond newscasts, since new FSAs would be needed per type of programming, and it is not obvious how to select the "correct" FSA for a given show when there are multiple ones to choose from.

U.S. Pat. No. 7,181,757—proposes a system for describing summaries of chapters in order for their retrieval and presentation. However, this prior art does not specify how these summaries are determined, other than a module for rules for selecting summaries, which are assumed to be manually edited for specific types of videos and therefore labor intensive and brittle.

U.S. Pat. No. 7,184,959—uses speaker identification to find chapter boundaries, plus additional analysis of video and text for chapter description and searches. The assumption is that chapters begin with anchors introducing them, and therefore is best suited for newscasts. It also requires a database of audio and visual samples of known anchors, and therefore would require on-going updates of the database to add new persons for the system to recognize.

U.S. Pat. No. 7,486,542—describes the retrieval and personalization of news clips via keyword queries. This prior art does not address how the chapters are determined, but instead focuses on presenting the detected chapters of newscasts to the users.

U.S. Pat. No. 7,646,960—describes a chapter detection method based on rate of change of "cells", which are effectively frames within videos. The assumption is chapter boundaries occur when there is a rapid change in the visual differences between frames, which is not robust since there are many non-transitions with frames that rapidly change, and true-transitions where the frames do not rapidly change. This method is also computationally expensive since it has to maintain many cells and how they change throughout the video stream.

U.S. Pat. No. 7,877,774—describes detecting newscast versus commercial boundaries via audio analysis, by automatic speaker analysis to find anchorpersons. The assumption is that chapters always begin with the anchorpersons making the introduction, which limits its application to programs outside of newscasts.

U.S. Pat. No. 8,189,114—describes chapter boundary detection based on analysis of visual differences between frames. The assumption is that chapter boundaries have transition effects and visual dissimilarities, which would result in too many false positives since most such transitions are not chapter boundaries. This prior art compensates by adding other methods of analysis to find correlations, which greatly increases complexity and computational costs.

U.S. Pat. No. 8,230,343—describes collecting metadata about segment boundaries, and collecting human inputs to correct errors and refine segment boundaries. This prior art requires recruitment and participation of humans in editing the metadata, and is not suitable for live video streams.

U.S. Pat. No. 8,392,183—describes summarization of videos based on grouping of similar textual sections into chapters and subsequent condensation. The assumption is that there needs to have a significant change in the subjects in the transcript between all chapters, which isn't necessarily the case for most video programming, especially for fictional works like sitcoms and movies. Conversely, there are programs where their subjects do change within the same chapter, such as game shows and interviews, and therefore this prior art would create more chapters than desired.

U.S. Pat. No. 8,422,859—describes commercial detection based on audio transitions. The assumption is that there's usually a change in audio characteristics between programming and commercials, which is not robust enough between all types of programming and all commercial types.

U.S. Pat. No. 8,479,238—describes generating metadata of videos based on textual analysis of transcripts, and enables users to query clips containing certain keywords. This prior art focuses on the analysis and querying of segments after their identification, but does not specify how the boundaries are automatically determined. Therefore, this prior art is predicated on chapter detection having taken place first.

U.S. Pat. Nos. 8,630,536 & 8,995,820—describe probabilistic commercial detection via batch processing, which is not well suited to live broadcasts.

SUMMARY OF THE INVENTION

The present invention describes a method for automatically detecting chapter boundaries in multimedia streams that works across all types of programming, e.g., newscasts, reality, sitcoms, movies, etc. It is also unique in its simplicity, which makes it computationally efficient and well suited for live broadcasts. Additionally, it is robust against variations in the structure of the video chapters, as well as different types of commercials that may be inserted within. Further, the invention does not require any editorial inputs or manual intervention before processing new content, as some prior art may require.

The present invention focuses on detecting, within multimedia streams, transitions between the primary programming and commercials. The main insight is that the primary programming remains the same between different airings of the same episode, while the intervening commercials almost always change between airings. Therefore, by aligning the multimedia streams between airings, the present invention can quickly and efficiently detect chapter boundaries by recognizing content regions that remain the same as the primary programming, and regions where they differ as commercials. For the occasional streams where this assumption doesn't hold, the present invention has the advantage of being able to automatically recognize this scenario and does not produce any erroneous chapters. This is in contrast to systems that may do well for chapter detection for some videos and poorly for others, yet they are unable to recognize the difference and therefore produce chapters of unpredictable quality.

In accordance with the invention there is provided a multimedia processing method comprising: identifying a start and end time ranges in an input multimedia stream; comparing said ranges to an alternate multimedia stream of the same program for regions of similarity; and defining time ranges as representing chapter regions responsive to the content of both streams within said time ranges having high similarities.

Identifying start and end time ranges in an input multimedia stream may comprise: extracting a text data stream from said input multimedia stream; comparing said text data stream to a text data stream from said alternate multimedia stream for start and end points where both streams are similar; and defining the start and end points of similarity as time ranges for potential chapter breaks.

Identifying the start and end time range in an input multimedia stream may further comprise: extracting an image data stream from said input multimedia stream; comparing said image data stream to an image data stream from said alternate multimedia stream for start and end points where both streams are similar; and defining the start and end points of similarity as time ranges for potential chapter breaks.

The method may further comprise: computing multi-resolution image signatures of said image data stream; and comparing said multi-resolution image signatures of said image data stream to the multi-resolution image signatures from the image data stream from said alternate multimedia stream for start and end points where both streams are similar.

Identifying start and end time range in an input multimedia stream may further comprise: extracting an audio data stream from said input multimedia stream; computing the mean energy of the audio data stream; and comparing said mean energy of said audio data stream to the mean energy of the audio data stream from said alternate multimedia stream for start and end points where both streams are similar.

The method may further comprise: computing the primary frequency components of said audio data stream; comparing said primary frequency components of said audio data stream to the primary frequency components of the audio data stream from said alternate multimedia stream for start and end points where both streams are similar.

The method may further comprise: computing the audio fingerprints of said audio data stream; and comparing said audio fingerprints of said audio data stream to the audio fingerprints of the audio data stream from said alternate multimedia stream for start and end points where both streams are similar.

Defining the range as representing a chapter break may comprise defining the range as representing commercial break further responsive to a start and end point where the content of both streams within said range are low in similarity.

The method may further comprise: maintaining the states of a finite-state automata in response to said start and end points of said potential chapter breaks; and emitting transitions and associated time points between the states of said finite-state automata as actual transitions between chapters and commercials of said input multimedia stream.

The method may further comprise: storing the chapter start and end points and the program information associated with said input multimedia stream in a storage device; and retrieving said chapter start and end points in response to queries for said program.

The method may further comprise: storing all identified start and end time ranges as potential chapter breaks and the program information associated with said input multimedia stream in a storage device; and retrieving said candidate chapter start and end points in response to queries for said program.

A non-transitory computer medium may store computer program code which, when executed on a computer, performs the method comprising: identifying a start and end time ranges in an input multimedia stream; comparing said ranges to an alternate multimedia stream of the same program for regions of similarity; and defining time ranges as representing chapter regions responsive to the content of both streams within the time ranges having high similarities.

The invention further provides a multimedia processing device comprising: a module configured to identify a start and end time ranges in an input multimedia stream as a module configured to compare said ranges to an alternate multimedia stream of the same program for regions of similarity; and a module configured to define the time ranges as representing chapter regions responsive to the content of both streams within the time ranges having high similarities.

The module may be configured to identify the start and end time ranges in an input multimedia stream is configured to extract a text data stream from said input multimedia stream, and the module configured to compare said range is configured to compare said text data stream to a text data stream from said alternate multimedia stream for start and end points where both streams are similar, wherein the module configured to define is configured to define the start and end points of similarity as time ranges for potential chapter breaks.

The module may be configured to identify the start and end time range is configured to extract the image data stream from said input multimedia stream and the module configured to compare said range is configured to compare said image data stream to the image data stream from said alternate multimedia stream for start and end points where both streams are similar, wherein the module configured to define is configured to define the start and end points of similarity as time ranges for potential chapter breaks.

The module may be configured to identify a start and end time range is configured to extract the audio data stream from said input multimedia stream and the device further comprises: a module configured to compute the mean energy of the audio data stream; and a module configured to compare said mean energy of said audio data stream to the mean energy of the audio data stream from said alternate multimedia stream for start and end points where both streams are similar.

The module may be configured to define the range as representing a chapter break is also configured to define the range as representing a commercial break further responsive to a start and end point where the content of both streams within said range are low in similarity.

There may be provided a module configured to maintain the states of a finite-state automata in response to said start and end points of said potential chapter breaks and emit transitions and associated time points between the states of said finite-state automata as actual transitions between chapters and commercials of said input multimedia stream.

The device may further comprise: a module for storing the chapter start and end points and the program information associated with said input multimedia stream in a storage device; and a module for retrieving said chapter start and end points in response to queries for said program.

The device may further comprise: a module for storing all identified start and end time ranges as potential chapter breaks and the program information associated with said input multimedia stream in a storage device; and a module for retrieving said candidate chapter start and end points in response to queries for said program.

DETAILED DESCRIPTION

Figure 1:
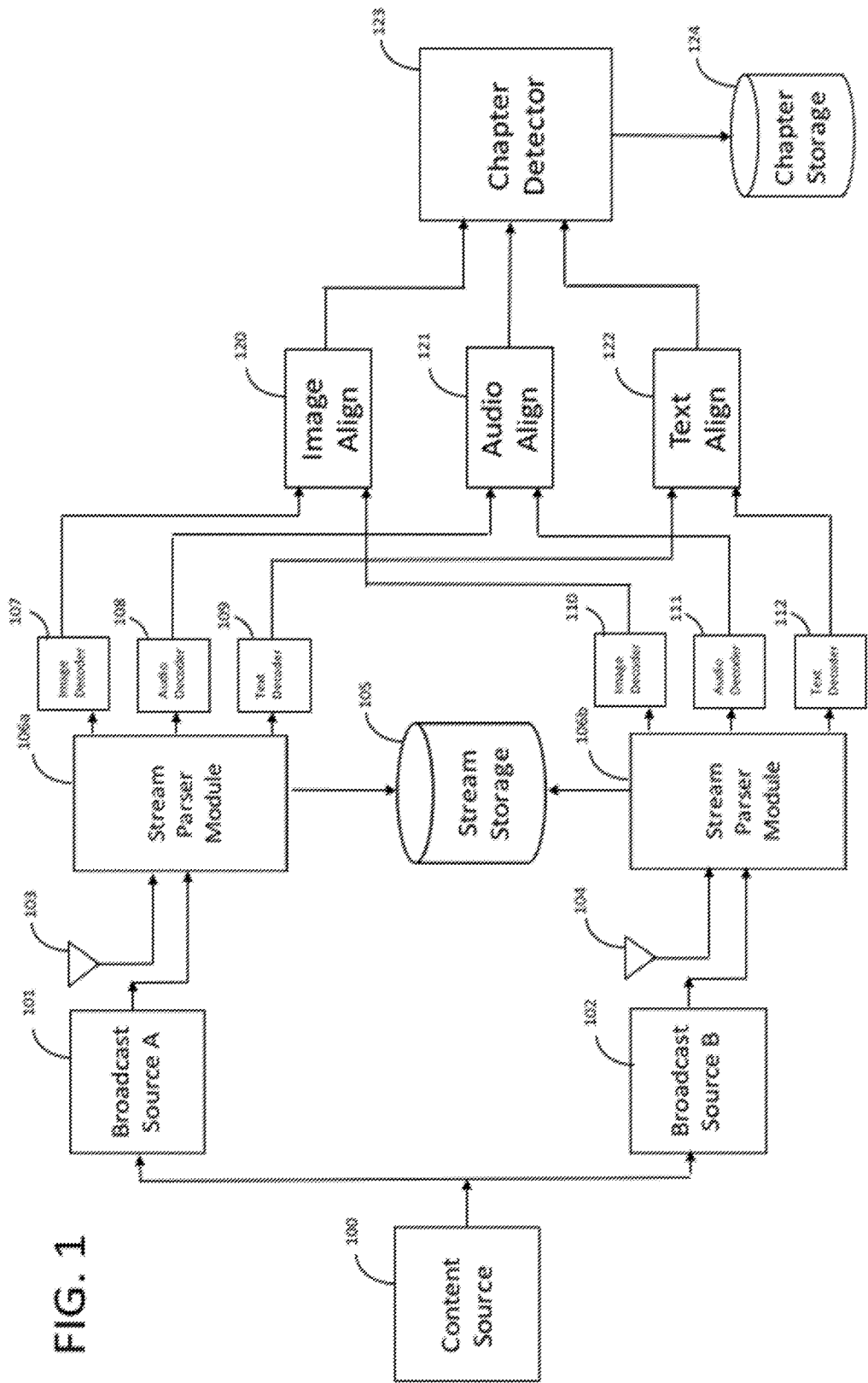
FIG. 1 is a schematic of the manner in which information is processed in an example.

FIG. 1 illustrates in schematic form the manner in which information is processed in accordance with an example according to the invention. As will be described in more detail below, some of the structures and functions illustrated in FIG. 1 represent optional functionality that need not be present in all implementations of the invention.

At the remote location, multimedia content from a source 100 is delivered to two different broadcasters 101 and 102, respectively denoted Broadcast Source A 101 and Broadcast Source B 102. The broadcasters 101 and 102 may be in different geographical locations, may be in different logical locations like different broadcast channels, or may be in different times within the same broadcaster. The multimedia content can be received in a multitude of methods, such as wirelessly, cable, over IP, etc., and may be a live public broadcast or may be privately transmitted, such as prior to the time of their public broadcast. The broadcasters 101 and 102 transmit the respective multimedia content received from the source 100 to a respective stream parser module 106a and 106b.

A broadcast multimedia stream is provided independently from sources 103 and 104. The source 103 provides a broadcast multimedia stream to the stream parser module 106a, and the source 104 provides a multimedia stream to the stream parser module 106b. The broadcast multimedia streams may be processed immediately by the respective stream parser module, or may be saved in a stream storage unit 105 connected to each stream parser module for later processing.

The multimedia streams are then processed by the respective stream parser modules 106a and 106b. Each stream parser module 106a and 106b is a standards-based stream decoder that extracts three separate data streams from the input streams. Each stream parser module 106a and 106b is associated with i) a respective image decoder 107 and 110 for extracting an image data stream, ii) a respective audio decoder 108 and 111 for extracting an audio data stream, and iii) respective text decoder 109 and 112 for extracting textual data streams.

Each pair of data streams of the same type are processed by their respective alignment modules. Specifically, the two image data streams from the image decoders 107 and 110 are forwarded to an image alignment module 120 for processing; the two audio data streams from the audio decoders 108 and 111 are forwarded to an audio alignment module 121 for processing, and the two textual data streams from the text decoders 109 and 112 are forwarded to a text alignment module 122 for processing. The details of these alignment modules are described in more detail in the following figures.

All streams are represented as a time series of data elements, meaning each item in the series is composed of a start and end time stamp, plus the associated data. Specifically, the image stream is composed of a series of the video frames, with each item consisting of its start and end time stamps, plus the image data for that frame. The audio stream is a time series of a sliding window of the audio stream, with each item consisting of its start and end time stamps, plus the audio data for that window. The text stream is a time series of the textual data, which could be either be decoded from the closed caption data embedded within the source stream, subtitle data attached to the multimedia stream, or via automatic speech-to-text conversion. The text stream is a time series with each item having the start and end time stamps, plus the text for that time span.

The outputs of the alignment modules 120, 121, and 122 are forwarded to a chapter detector module denoted by reference numerals 123. The chapter detector module 123 performs a global alignment across the multiple alignments generated by the three alignment modules 120, 121, 122.

The final output from the chapter detector module 123 are the chapter and commercial boundaries of the input multimedia stream, which is then saved to a chapter storage unit denoted by reference numerals 124.

Figure 2:
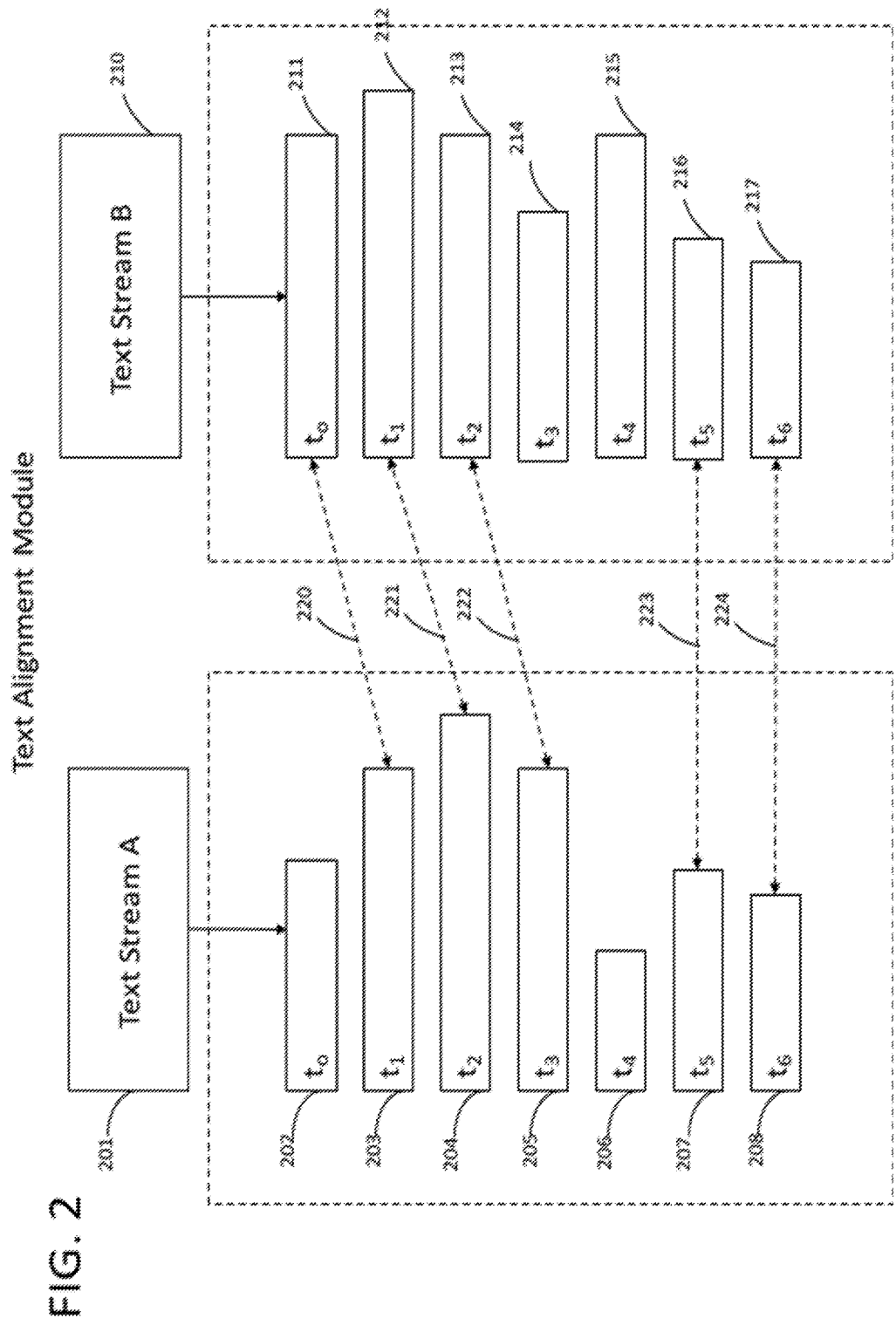
FIG. 2 depicts an exemplary text alignment module.

FIG. 2 illustrates in schematic form an exemplary manner in which two example text streams are processed by the text alignment module 122. This module takes as inputs two text streams 201 and 210 denoted as Text Stream A and Text Stream B respectively. The text streams are a time series of text items and their associated time stamps. For simplicity, only the start time stamps are shown, and the width of the items are to illustrate the length of each text item.

Shown on the left of FIG. 2, the first seven items from Text Stream A 201 are drawn from top to bottom and denoted by reference numerals 202, 203, 204, 205, 206, 207, and 208. On the right of FIG. 2, the first seven items from Text Stream B 210 are also drawn from top to bottom and denoted by reference numerals 211, 212, 213, 214, 215, 216, and 217.

Due to variations in broadcast timing and commercials, the items from the two text streams do not align directly. The task for the text alignment module 122 is to identify the items where the two streams match each other. In this example, a first match as denoted by dashed arrow 220 is between items 203 and 211; a second match as denoted by dashed arrow 221 is between 204 and 212; a third match as denoted by dashed arrow 222 is between items 205 and 213; a fourth match as denoted by dashed arrow 223 is between 207 and 216; and a fifth match as denoted by dashed arrow 224 is between 208 and 217.

The algorithms for computing such alignments are well known and familiar to those skilled in the art. Matching of the text streams is based on identifying matching text, by comparing text strings. One modification to well-known techniques which may be implemented is for the comparison between two text items not to be exact string comparison, but instead to be based on a percentage of overlap of the characters within the string. This is needed to account for a situation where the decoding of the text stream may be imperfect due to the noise introduced during the broadcasting and capturing processes of the original multimedia stream.

Figure 3:
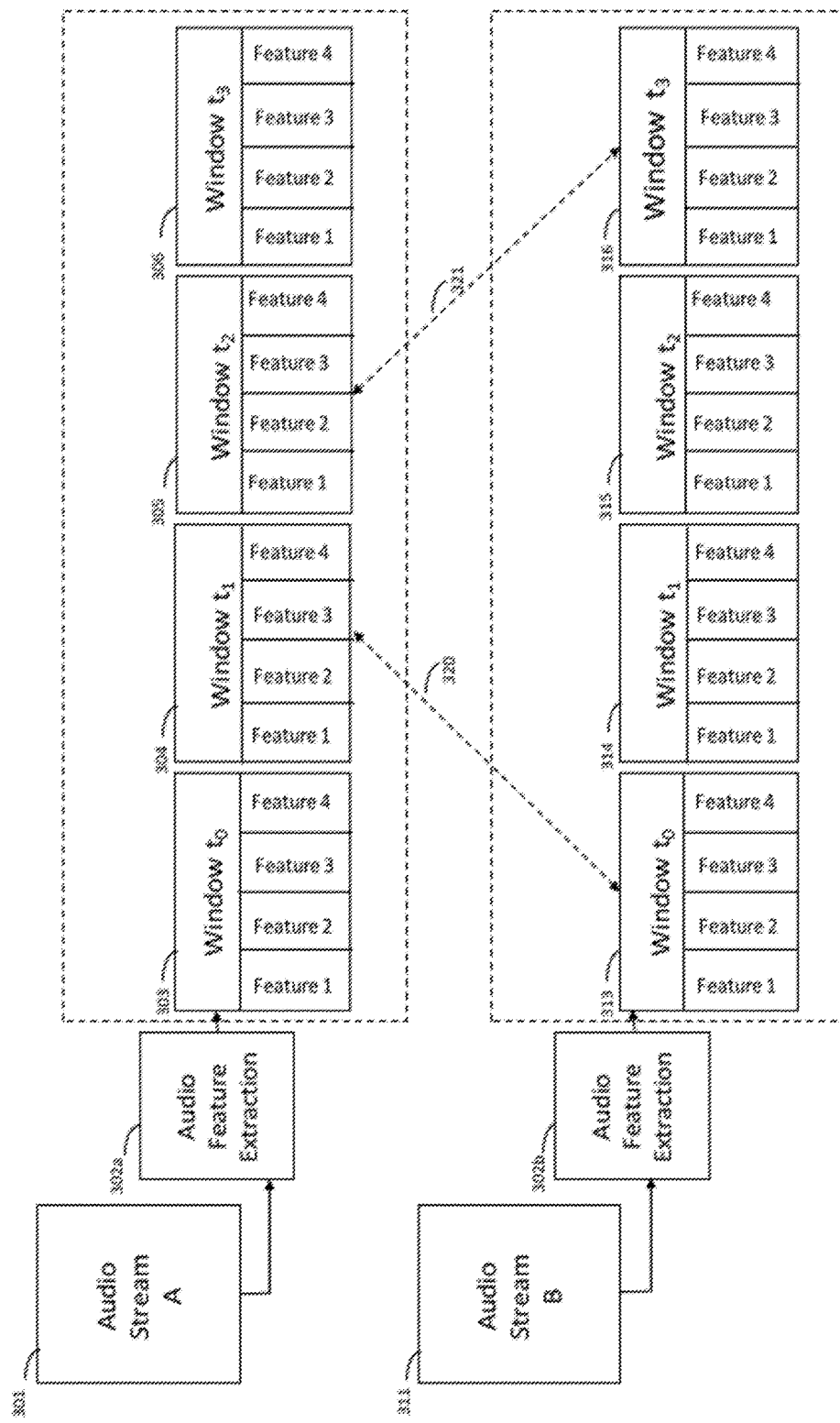
FIG. 3 depicts an exemplary audio alignment module.

FIG. 3 illustrates in schematic form an exemplary manner in which two example audio streams are processed by the audio alignment module 121. This module takes as inputs two audio streams 301 and 311 denoted as Audio Stream A and Audio Stream B. The audio streams are digital representations of the original audio signals. These two audio streams are separately processed by respective audio feature extraction modules 302a and 302b. The audio extraction modules subdivide the input audio stream into overlapping windows, perform analysis of the audio signal within each window, and output a time series composed of the extracted audio features and the associated start and end time stamps for that window item. Aligning of the audio streams is based on identifying highly similar audio windows. The audio features extracted are implementation specific and can be chosen by the implementer, with the main goal of choosing ones that would facilitate efficient similarity comparisons between two windows. These features can include, for example, average energy, central frequency band energy, fast Fourier transforms, audio fingerprints, and even speaker identification. These algorithms for audio feature extraction are well known and familiar to those skilled in the art.

Illustrated at the top of FIG. 3, the first four items of the audio time series from Audio Stream A 301 are drawn from left to right and denoted by reference numerals 303, 304, 305, and 306. At the bottom of FIG. 3, the first four items of the audio time series from Audio Stream B 311 are drawn from left to right and denoted by reference numerals 313, 314, 315, and 316. The task for the audio alignment module 121 is to find the matching window items between the two time series. In this example, a first match is identified between window items 304 and 313 as denoted by dashed arrow 320, and a second match is identified between window items 305 and 316 as denoted by dashed arrow 321. The output of this alignment from the alignment module 121 is sent to the chapter detector module 123 for further processing.

The mean energy of the audio data stream may be computed. Said mean energy of said audio data stream may be compared to the mean energy of the audio data stream from another multimedia stream.

The primary frequency components of said audio data stream may be computed. Said primary frequency components of said audio data stream may be compared to the primary frequency components of the audio data stream from another multimedia stream.

Audio fingerprints of said audio data stream may be computed. Said audio fingerprints of said audio data stream are compared to the audio fingerprints of the audio data stream from another multimedia stream.

Figure 4:
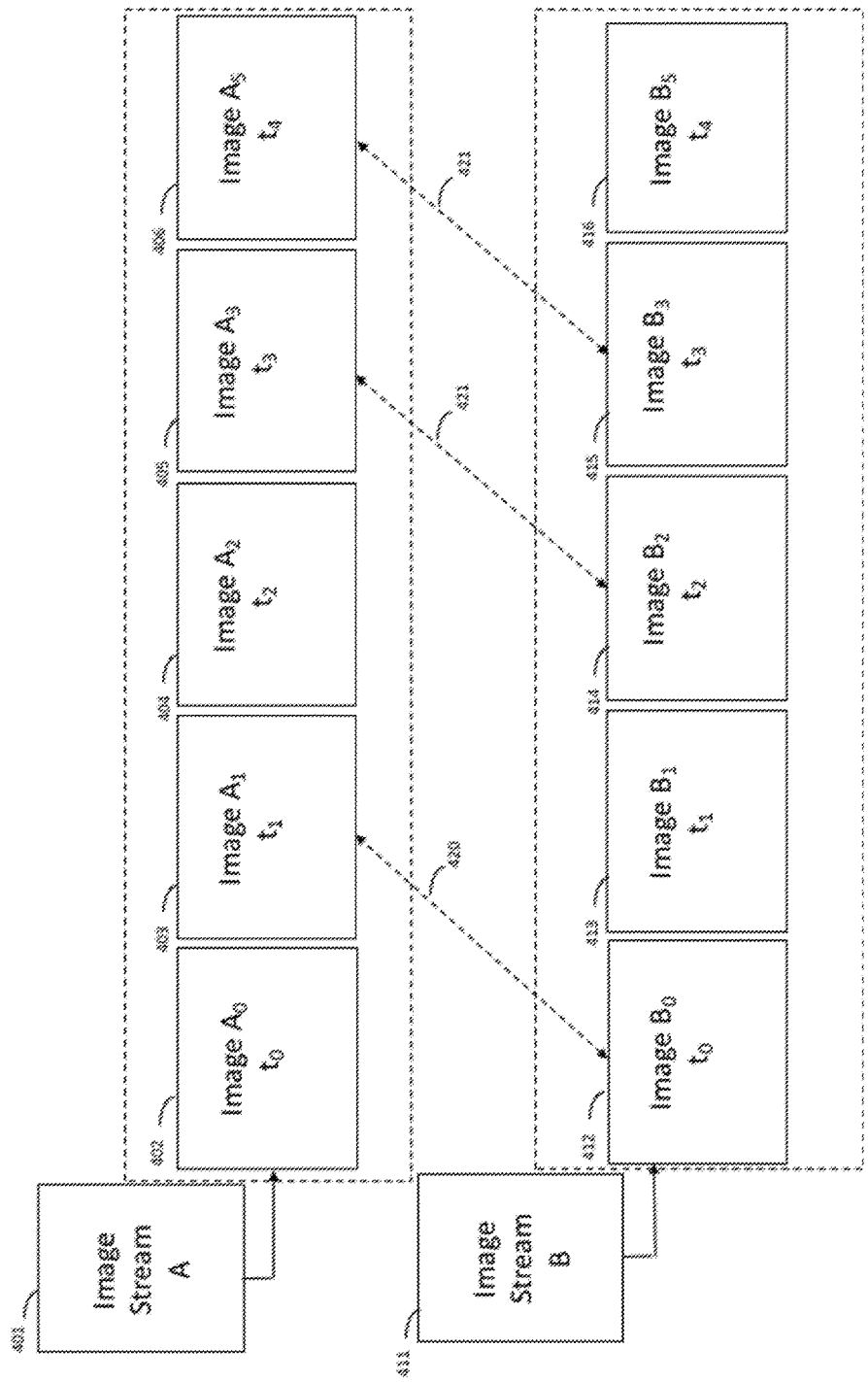
FIG. 4 depicts an exemplary image alignment module.

FIG. 4 illustrates in schematic form an exemplary manner in which two example image streams are processed by the image alignment module 120. This module takes as inputs two image streams 401 and 411 denoted as Image Stream A and Image Stream B respectively. The image streams are time series of images and associated time stamps for each.

Illustrated at the top of FIG. 4, the first five items of the image time series from Image Stream A 401 are drawn from left to right and denoted by reference numerals 402, 403, 404, 405 and 406. At the bottom of FIG. 5, the first five items of the image time series from Image Stream B 411 are drawn from left to right and denoted by reference numerals 412, 413, 414, 415 and 416. The task for the image alignment module 120 is to find the matching image items between the two time series. In this example, a first match as denoted by dashed arrow 420 is between items 403 and 412; a second match as denoted by arrow 421 is between items 405 and 414; and a third match 422 as denoted by arrow 421 is between items 406 and 415. Aligning of the image streams is based on identifying matching images. The method for comparing whether two images are a match is implementation specific and chosen by the implementer. Examples of methods include exact matching, image pyramid matching, image fingerprinting matching, and even via semantic image analysis. The decisions of which method to apply may be based on how robust the system needs to be against noise in the input images, with the trade off of increased computational complexity. These image comparison algorithms and their trade offs are well known and familiar to those skilled in the art. The output of this alignment is sent to the chapter detector module 123 for further processing.

Multi-resolution image signatures of said image data stream may be computed, and said multi-resolution image signatures of said image data stream compared to multi-resolution image signatures from the image data stream from another multimedia stream.

Multi-resolution semantic image analysis of said image data stream may be computed, and said multi-resolution semantic image analysis of said image data stream compared to multi-resolution semantic image analysis from the image data stream from another multimedia stream.

Figure 5:
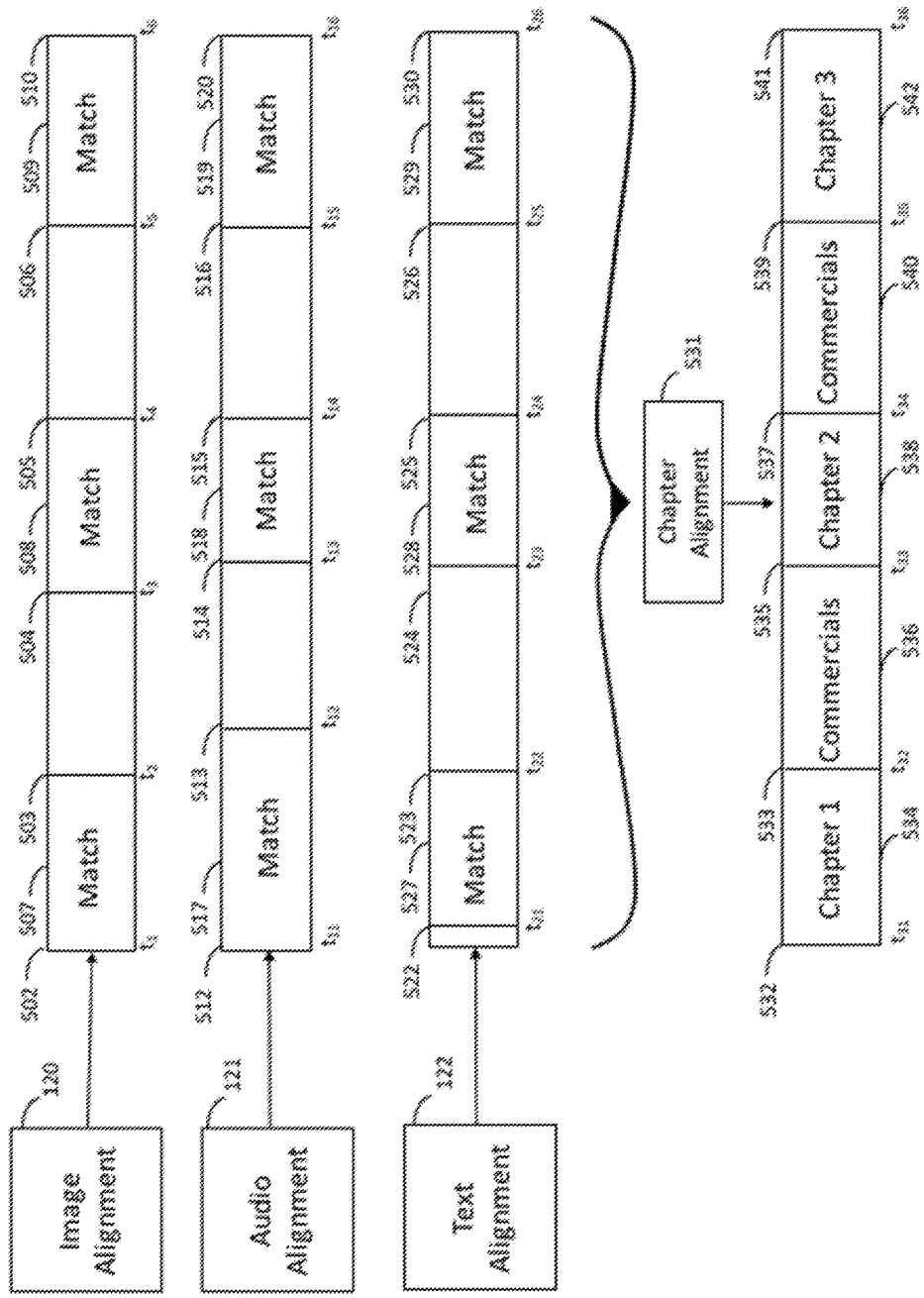
FIG. 5 depicts an exemplary chapter detector module.

FIG. 5 illustrates in schematic form an exemplary manner in which the outputs from the image alignment module 120, audio alignment module 121, and text alignment module 122 are processed by the chapter detector module 123.

The outputs from the alignment modules are drawn in a pictorial representation, whereby the matches found by each alignment and their associated timestamps are rendered as horizontal timelines. At the left of the timeline is the beginning of the broadcast program, and the right being the end. Note that in this example, the regions of matches between the three alignments are not exactly the same (e.g., 502 and 512 are aligned, but 503 and 513 are not), which is intentional to illustrate how this module accounts for noise and occasional true differences between the match boundaries.

The image alignment module 120 generates an output with match regions 507, 508, 509. The match region 507 has start time 502 and end time 503, denoting respective times $t_1$ and $t_2$. The match region 508 has start time 504 and end time 505, denoting respective times $t_3$ and $t_4$. The match region 509 has start time 506 and end time 510, denoting respective times $t_5$ and $t_6$.

The audio alignment module 121 generates an output with match regions 517, 518, 519. The match region 517 has start time 512 and end time 513, denoting respective times $t_{11}$ and $t_{12}$. The match region 518 has start time 514 and end time 515, denoting respective times $t_{13}$ and $t_{14}$. The match region 519 has start time 516 and end time 520, denoting respective times $t_{15}$ and $t_{16}$.

The text alignment module 122 generates an output with match regions 527, 528, 529. The match region 527 has start time 522 and end time 523, denoting respective times $t_{21}$ and $t_{22}$. The match region 528 has start time 524 and end time 525, denoting respective times $t_{23}$ and $t_{24}$. The match region 529 has start time 526 and end time 530, denoting respective times $t_{25}$ and $t_{26}$.

The objective of the chapter detector module 123 is to select the boundaries for each match region that is as close to the true chapter boundaries as possible. A chapter alignment module denoted by reference numerals 531 is provided within the chapter detector module 123 for this purpose. There are multiple options that are determined, having trade-offs between simplicity and accuracy. One simple approach is to take each matching region with overlaps between alignments, such as match regions 507, 517, and 527, and use the minimum of the starting time stamps $t_1$, $t_{11}$, and $t_{21}$ as the starting timestamp of this chapter, i.e., $t_1$, and the maximum of the ending timestamps $t_2$, $t_{12}$, and $t_{22}$ as the ending timestamp, i.e., $t_{12}$. In the cases where the match regions line up well, this approach works well and is highly efficient. However, if there are drifts or noise between the inputs, this approach would likely result in more match regions with incorrect start and/or end times than desired.

Another approach is to treat each chapter boundaries as a voting process. Intuitively, a perfect alignment would be a consensus across all three inputs, whereas a boundary with no other match is treated as an outlier.

As shown in the example of FIG. 5, the chapter alignment module 531 takes the output from the alignment modules 120, 121, 122 and generates a stream comprising chapters and commercials.

The stream is shown as comprising a first chapter Chapter 1 denoted by reference numeral 534, a second chapter Chapter 2 denoted by reference numeral 538, and a third chapter Chapter 3 denoted by reference numeral 542. The stream start at time $t_{31}$ denoted by reference numeral 532 at the start of Chapter 1 534. Chapter 1 534 ends at time $t_{32}$ denoted by reference numeral 533, at which point commercials 536 start. The commercials 536 end at time $t_{33}$, denoted by reference numeral 535, for the start of Chapter 2 538. Chapter 2 ends at time $t_{34}$ denoted by reference numeral 537, at which point commercials denoted by reference numeral 540 start. The commercials 540 end at time $t_{35}$, denoted by reference numeral 539, for the start of Chapter 3 542. Chapter 3 ends at time $t_{36}$ denoted by reference numeral 541.

Time $t_{31}$ aligns with time $t_1$ and time $t_{11}$. The time $t_{32}$ aligns with time $t_2$ and $t_{22}$. The time $t_{33}$ aligns with time $t_{13}$ and $t_{23}$. The time $t_{34}$ aligns with times $t_4$, $t_{14}$, $t_{24}$. Time $t_{35}$ aligns with times $t_5$, $t_{15}$, $t_{25}$. Time $t_{36}$ aligns with times $t_6$, $t_{16}$, $t_{26}$.

In an example implementation of the chapter alignment module 531 in FIG. 5, a finite state automata (FSA) may be used to compute the desired outputs of the time stamps between chapters and commercials, with the states being either the start, a chapter, or a commercial, and the transitions are the individual match region start and end boundaries detected by the three input alignment modules.

Figure 6:
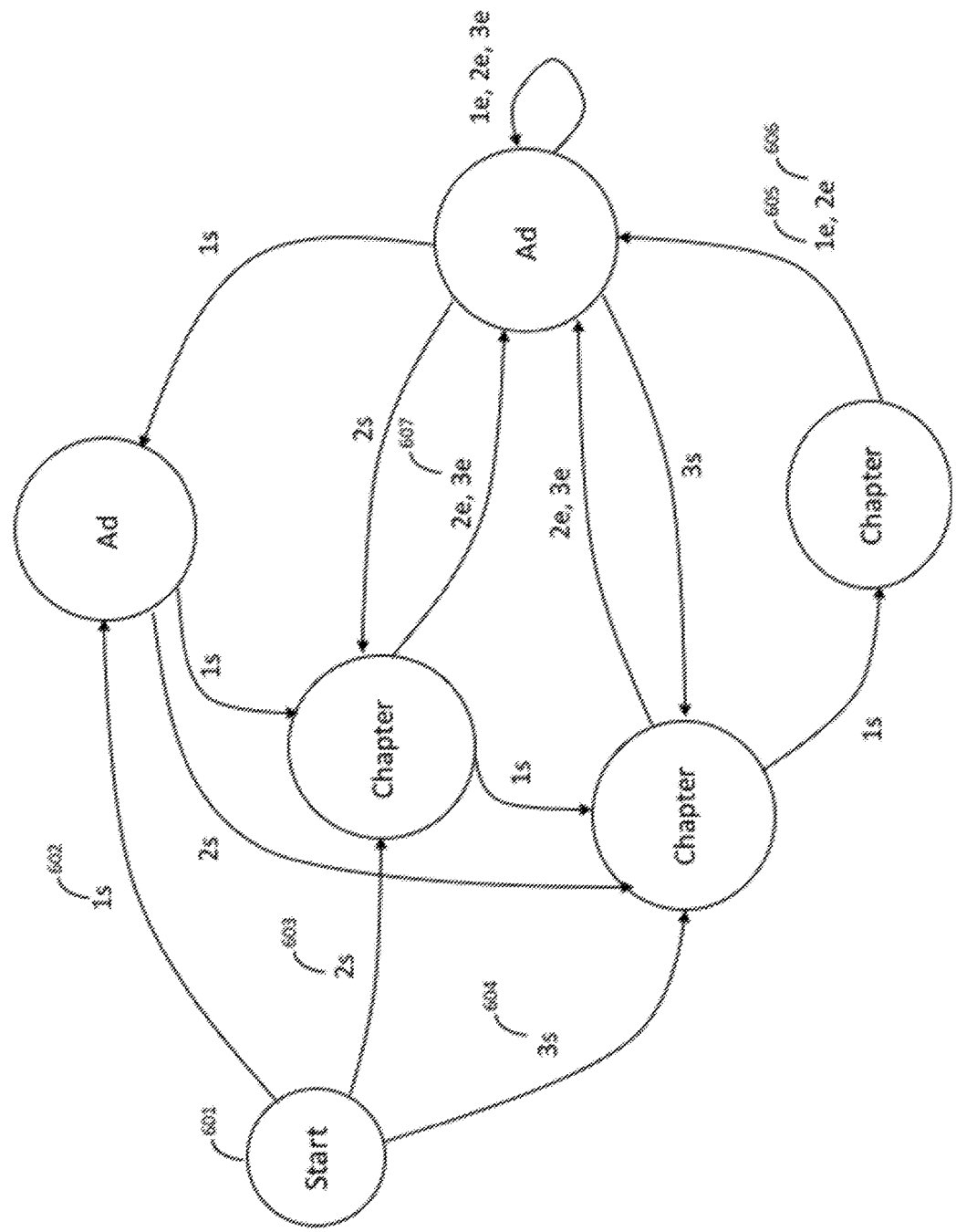
FIG. 6 is a schematic of the states and transitions in an exemplary finite state automata.

An example FSA is described in more detail in FIG. 6. The outputs of the chapter detector module 123 via the FSA are the starting and ending timestamps of each chapter, such as the first chapter 534 with the start timestamp of $t_{31}$ 532 and end timestamp of $t_{32}$ 533, followed by the first commercial 536 with start timestamp of $t_{32}$ 533 and end timestamp of $t_{33}$ 535, etc.

FIG. 6 illustrates in schematic form the states and transitions of the Finite State Automata used within the chapter alignment module 531. For clarity's sake, not all transitions are shown except the commonly occurring ones, and the end state is also omitted since it is simply triggered at the end of the multimedia stream.

The FSA begins at the Start state 601, and it follows the transitions as it processes the three input alignment data, which can either be start or end boundaries. The transitions are denoted as 1s for single start boundary (e.g., 602), 2s for two start boundaries (e.g., 603), and 3s for three start boundaries (e.g., 604). Similarly, 1e for single end boundary (e.g., 605), 2e for two end boundaries (e.g., 606), and 3e for three end boundaries (e.g., 607). Based on the next alignment boundary or boundaries and its current state, the FSA updates its state as to whether it is either in a Chapter state (e.g., 611) or Commercial (Ad) state (e.g., 610). This traversal process of the FSA continues until all of the match boundaries have been evaluated by the FSA. The output of the FSA is the final chapter boundaries, which are simply the starting and ending timestamps of all state changes between a Chapter and Commercial (Ad) state, or vice versa.

Using the example inputs from FIG. 5. into the chapter alignment module 531, they trigger the following state transitions through the FSA. Starting at the Start state 601, the inputs $t_1$,$t_{11}$ trigger the 2s transition into the Chapter state. The next input $t_{21}$ triggers the 1s transition into a different Chapter state. The next inputs $t_2$,$t_{22}$ trigger the 2e transition into the Ad state, followed by 1e transition triggered by $t_{12}$ into another Ad state. This traversal continues as is triggered by $t_3$ into Ad state, 2s triggered by $t_{13}$,$t_{23}$ into Chapter state, 3e triggered by $t_4$,$t_{14}$,$t_{24}$ into Ad state, 3s triggered by $t_5$,$t_{15}$,$t_{25}$ into Chapter state, 3e triggered by $t_6$,$t_{16}$,$t_{26}$ into Ad state, and finally End state at the end of the multimedia stream. Therefore, the final output of the FSA for this example input would be: chapter from $t_1$/$t_1$ to $t_2$/$t_{22}$, commercial from $t_2$/$t_{22}$ to $t_{13}$/$t_{23}$, chapter from $t_{13}$/$t_{23}$ to $t_4$/$t_{14}$/$t_{24}$, commercial from $t_4$/$t_{14}$/$t_{24}$ to $t_5$/$t_{15}$/$t_{25}$, chapter from $t_5$/$t_{15}$/$t_{25}$ to $t_6$/$t_{16}$/$t_{26}$, and commercial/end at $t_6$/$t_{16}$/$t_{26}$.

Figure 7:
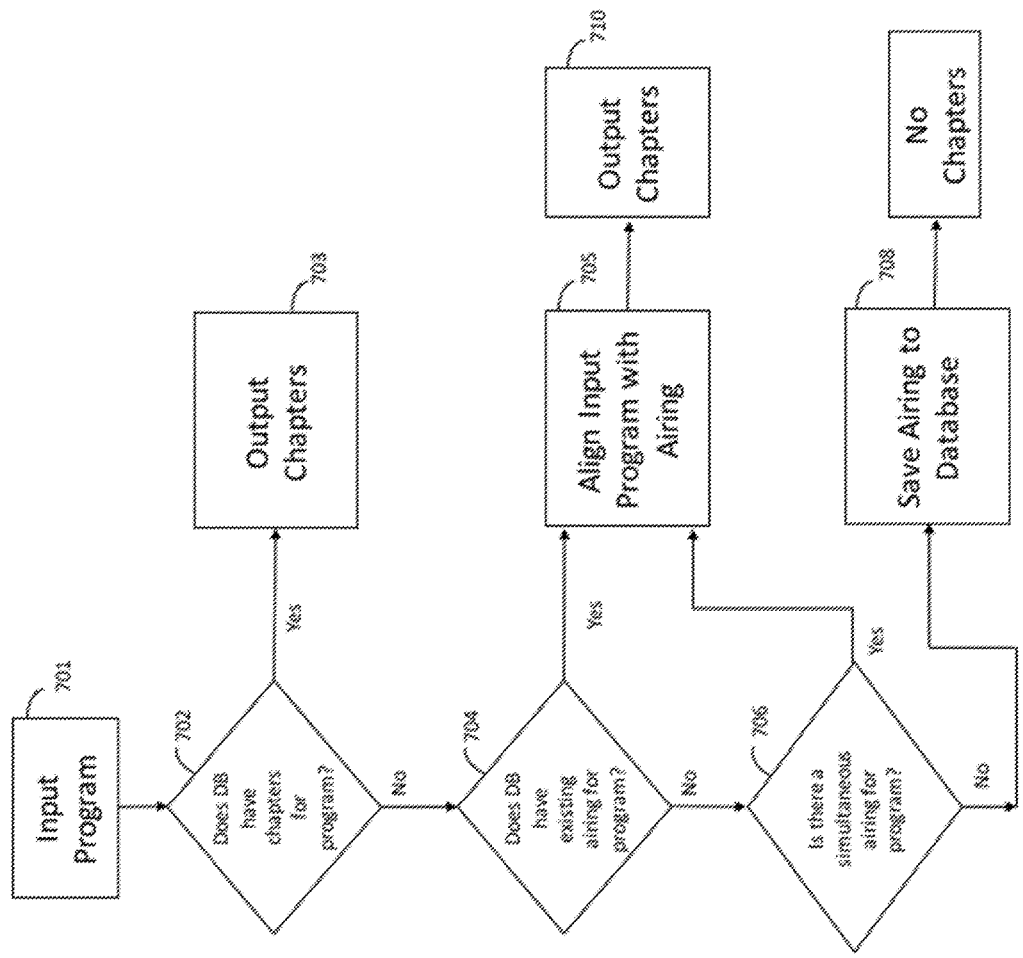
FIG. 7 illustrates an exemplary flowchart of the manner in which the system makes decisions.

FIG. 7 illustrates in a flowchart form an exemplary manner in which the overall system makes decisions on how to process an incoming input multimedia stream represented as a program, which at the minimum is simply a unique identifier of the multimedia stream that is consistent across airings. The process starts in step 701. The database is first checked for existing chapters for the input program in step 702, and if any exist, the chapters are returned in step 703 and the task is done. If there are no existing chapters, the database is checked for previous airings of the program in step 704. If a previous airing of the program exists, the streams from the current airing and the previous airing are sent to the chapter detector module in step 705 to generate the chapter boundaries in step 710. If there are no previous airings, the last condition for a simultaneous airing of the program is checked in step 706. If there is a simultaneous airing, then the streams from the simultaneous airings are sent to the chapter detector module in step 705. Lastly, if there are no simultaneous airings, then this airing is saved to the database in step 708 and no chapters can be generated for this program for the time being. However, one can choose to fall back to alternate methods that can analyze single streams to determine chapter boundaries as a first pass, and revert to the present invention once there is another airing of the same program to improve the chapter boundaries accuracy.

The present invention greatly simplifies the detection of chapters within multimedia streams, by taking advantage of the differences of commercials inserted between the chapters within. This invention avoids the many assumptions needed by prior art about the format and composition of multimedia programming or commercials, which often change over time. This invention also greatly minimizes the analysis needed on the multimedia streams themselves, by using very efficient and reliable similarity computations, instead of relying on complex and less reliable semantic analyses.

Examples and embodiments in accordance with the invention may be implemented as method processes in software. Such software may be stored on appropriate software storage media. Stored software, when executed on a computer, preferably performs a process in accordance with the described methods.

The invention has been described by way of examples, and is not limited to the specific examples given. Different parts of different examples may be combined. The invention is not limited to the specifics of any described example.

What is claimed is:

1. A multimedia processing method comprising:
   receiving a program in a first multimedia stream;
   identifying portions of content in the first multimedia stream, each of the portions of content having a start point and an end point, wherein the start and end points of the portions of content in the first multimedia stream are potential transitions between chapters of the program and portions of content that do not represent a chapter of the program;
   identifying portions of content provided in a second multimedia stream, the second multimedia stream including the program, each of the portions of content having a start point and an end point, wherein the start and ends points of the portions of content in the second multimedia stream are potential transitions between the chapters of the program and portions of content that do not represent a chapter of the program;
   comparing the portions of content in the first multimedia stream to the portions of content in the second multimedia stream;
   identifying the portions of content in the first multimedia stream and portions of content in the second multimedia stream having high similarity;
   defining the portions of content in the first multimedia stream and portions of content in the second multimedia stream having high similarity as being a defined chapter of the program; and
   defining the start point and the end point of each defined chapter of the program based on the start point and the end point of the corresponding portions of the program in the first multimedia stream and the second multimedia stream.

2. The method of claim 1, wherein identifying portions of content in the first and second multimedia streams comprises:
   extracting text data streams from the first and second multimedia streams; and
   wherein comparing the portions of content in the first multimedia stream to the portions of content in the second multimedia stream comprises comparing text portions.

3. The method of claim 1, wherein identifying the portions of content in the first multimedia stream and portions of content in the second multimedia stream comprises:
   extracting image data streams from the first and second multimedia streams; and
   wherein comparing the portions of content in the first multimedia stream to the portions of content in the second multimedia stream comprises comparing image data portions.

4. The method of claim 3, further comprising:
   computing multi-resolution image signatures of the image data streams; and
   comparing the multi-resolution image signatures.

5. The method of claim 1, wherein identifying the portions of content in the first multimedia stream and portions of content in the second multimedia stream comprises:
   extracting audio data streams from the first and second multimedia streams;
   computing mean energy of the audio data streams; and
   wherein comparing the portions of content in the first multimedia stream to the portions of content in the second multimedia stream comprises comparing the mean energy of the portions.

6. The method of claim 5, further comprising:
   computing primary frequency components of the audio data streams; and
   comparing the primary frequency components of the audio data streams.

7. The method of claim 5, further comprising:
   computing audio fingerprints of the audio data streams; and
   comparing the audio fingerprints of the audio data streams.

8. The method of claim 1, further comprising:
   maintaining states of a finite-state automata in response to the start and end points of the potential transitions between chapters; and
   emitting transitions and associated time points between the states of the finite-state automata as actual transitions between the chapters of the program and the portions of content that do not represent a chapter of the program.

9. The method of claim 1, further comprising:
   storing chapter start and end points and program information associated with the respective multimedia stream in a storage device; and retrieving the chapter start and end points in response to queries for the program.

10. The method of claim 1, further comprising:
storing all the identified start and end time ranges as the potential transitions between chapters and program information associated with the respective multimedia stream in a storage device; and
retrieving the identified start and end time ranges in response to queries for the program.

11. A non-transitory computer medium for storing computer program code which, when executed on a computer, performs the method of claim 1.

12. The method of claim 1, further comprising receiving the second multimedia stream, and identifying portions of content of the program provided in the second multimedia stream, substantially simultaneously to identifying portions of content of the program provided in the first multimedia stream.

13. The method of claim 1, further comprising storing the second multimedia stream, and retrieving the portions of content of the program provided in the second multimedia stream for comparing with portions of content of the program received in the first multimedia stream.

14. The method of claim 1, wherein the second multimedia stream has previously broadcast the program, the method further comprising accessing the previously broadcast second multimedia stream, and identifying portions of content of the program provided in the second multimedia stream for comparing with portions of content of the program received in the first multimedia stream.

15. The method of claim 1, further comprising defining the portions of content as having low similarity as not being a chapter of the program.

16. The method of claim 1 wherein the portions of content of the respective first and second multimedia streams that do not represent a chapter of the program are specific to the respective multimedia stream.

17. A multimedia processing device comprising:
a receiver to receive a program in a first multimedia stream;
a processor to parse and detect in the first multimedia stream an identifier identifying portions of content in the first multimedia stream, each portion having a start point and an end point, wherein start and end points of the portions of content in the first multimedia stream are potential transitions between chapters of the program and portions of the content that do not represent a chapter of the program;
a processor to determine an alignment feature by comparing portions of content of the program in the first multimedia stream to portions of content in a second multimedia stream, the second multimedia stream including the program, each portion of content in the second multimedia stream having a start point and an end point, wherein the start and end points of the portions of content in the second multimedia stream are potential transitions between chapters of the program and portions of content that do not represent a chapter of the program, to identify portions of content of the program in the first multimedia stream and portions of content of the program in the second multimedia stream having high similarity; and
a chapter detector to detect the portions of contents having high similarity as being a defined chapter of the program, and to detect a start point and an end point of each defined chapter based on the start point and the end point of the corresponding portions of the program in the first and second multimedia streams.

18. The device of claim 17, further comprising:
a storage device for storing chapter start and end points and program information associated with the first multimedia stream and for retrieving the chapter start and end points in response to queries for the program.

19. The device of claim 17, further comprising:
a storage device for storing all the identified start and end time ranges as the potential transitions between chapters and program information associated with the first multimedia stream and for retrieving the identified start and end time ranges in response to queries for the program.

* * * * *